Patented Mar. 26, 1929.

1,706,784

UNITED STATES PATENT OFFICE.

HANS JORDAN, OF BERLIN-STEGLITZ, WALTER SCHOELLER, OF BERLIN-WESTEND, AND REINHARD CLERC, OF BERLIN, GERMANY, ASSIGNORS TO THE FIRM: CHEMISCHE FABRIK AUF ACTIEN VORM. E. SCHERING, OF BERLIN, GERMANY.

PROCESS FOR THE PRODUCTION OF MENTHOL.

No Drawing. Application filed August 15, 1927. Serial No. 213,205, and in Germany February 22, 1927.

Our invention refers to the production of menthol and its isomers and homologues, and more especially to a process which allows obtaining these products in a particularly simple manner and at low cost.

The invention is based primarily on the discovery disclosed in the application for patent of the United States filed jointly by Walter Schoeller and Hans Jordan, Serial No. 200,298, that menthol and its isomers and homologues can be obtained by treating the products which result in the decomposition of the condensation products from m- or p-cresol and acetone with hydrogen, until eight hydrogen atoms have entered into combination. A method of producing these condensation products by condensing m- or p-cresol and acetone in the presence of a condensing agent, for instance hydrochloric acid, at 40° C. was disclosed in Hans Jordan's patent application Serial No. 200,-289, and it had also been stated that, if instead of pure m-cresol or p-cresol crude cresol (cresolum crudum), which is a mixture of m- and p-cresol, is used as starting product in the condensation process, decomposition at about 300° C. of the condensation product obtained will result in the formation of a mixture of 3-methyl-6-isopropylene phenol and 4-methyl-6-isopropylene phenol.

We have now ascertained that if this mixture of isomers is treated with hydrogen as aforedescribed, contrary to all expectations a carefully conducted fractional distillation, assisted, if necessary, by a freezing-out treatment, will allow recovering menthol and its isomers separately in a practically satisfactory manner. This possibility could not be foreseen and it is the more surprising, as the two cresols (m-cresol and p-cresol) having closely related boiling points cannot properly be separated by physical methods. In view of the low price of crude cresol this invention is of particular importance from an economic point of view.

*Example.*

The product of condensation from crude cresol and acetone described in Hans Jordan's application Serial No. 200,289 is heated to about 300° C., and the mixture of 3 - methyl - 6 - isopropylene phenol and 4-methyl-6-isopropylene phenol is treated with hydrogen at 140–160° C., if desired under pressure, in the presence of a mixed catalyst containing Ni and another metal, such as Cu, Co, Fe, and the like, either in reduced state or as carbonates, hydroxides or the like, until 8 atoms hydrogen have entered into combination. The resulting mixture is subjected to fractional distillation in a distillation column, preferably in vacuo. From the higher boiling fractions menthol can be recovered in a well known manner.

Various changes may be made in the details disclosed in the foregoing specification without departing from the invention or sacrificing the advantages thereof.

We claim:—

1. The process of producing menthol and its isomers comprising heating the product of condensation of crude cresol which mainly contains m- and p-cresol and acetone at about 300° C. to effect decomposition thereof, treating the decomposition product with hydrogen in the presence of a hydrogenation catalyst at about 140° C. to 160° C. until eight atoms hydrogen have entered into combination, and subjecting the resulting mixture to careful fractional distillation.

2. The process of producing menthol and its isomers comprising heating the product of condensation of crude cresol which mainly contains m- and p-cresol and acetone at about 300° C. to effect decomposition thereof, treating the decomposition product with hydrogen in the presence of a hydrogenation catalyst at about 140° C. to 160° C. until eight atoms hydrogen have entered into combination, and subjecting the resulting mixture to careful fractional distillation in vauco.

3. The process of producing menthol and its isomers comprising heating the product of condensation of crude cresol which mainly contains m- and p-cresol and acetone at about 300° C. to effect decomposition thereof, treating the decomposition product with hydrogen in the presence of a hydrogenation catalyst at about 140° C. to 160° C. until eight atoms hydrogen have entered into combination, and subjecting the resulting mixture to careful fractional distillation and to freezing-out.

In testimony whereof we affix our signatures.

HANS JORDAN.
WALTER SCHOELLER.
REINHARD CLERC.